June 19, 1962 — C. E. PALMER ETAL — 3,039,612
FILTER BED AGITATOR
Filed July 21, 1958 — 3 Sheets-Sheet 1

INVENTORS
CHARLES E. PALMER
BY
ATTORNEY

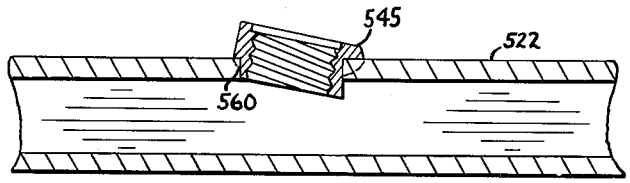
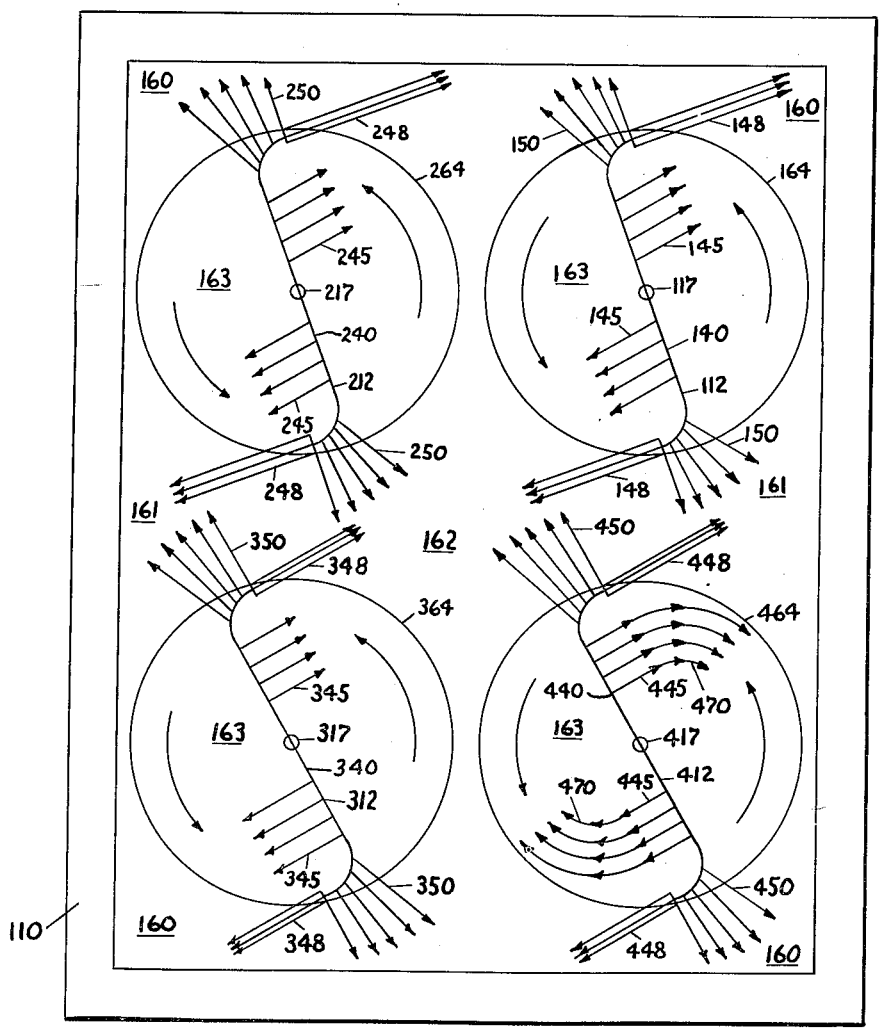
Fig. 9
Fig. 8
INVENTOR.
CHARLES E. PALMER
BY
*Charles L. Lombard*
ATTORNEY 3,039,612
FILTER BED AGITATOR
Charles E. Palmer and Robert H. Palmer, both of
R.D. 1, W. Lake Road, Lake City, Pa.
Filed July 21, 1958, Ser. No. 749,909
3 Claims. (Cl. 210—272)

This invention relates to agitators and, more particularly, to an improved design of filter bed agitator and bearing an improved method of cleaning filter medium during the backwash cycle of filtration.

The invention described herein covers an improved design of filter bed agitator and bearing and a resulting improved method of cleaning filter medium such as is used in all types of filtering devices known as open gravity and pressure type filters or similar equipment used in the treatment of water or industrial solutions to remove undesired elements of organic, inorganic, or fissionable residue materials from the water or industrial solutions.

The extreme variations in filter design previously in use arising out of the variety of filter applications, types of water or solutions to be filtered, and space requirements make it impossible to accurately predetermine nozzle spacings, angles of nozzles, nozzle orifices, and pressures required for the most efficient and economical operation until details of the specific application are known. Thus, no specified details and dimensions are disclosed herein. This adaptability of the agitator disclosed herein to a variety of applications is one important advantage of the present invention and it provides an improved method of washing or cleaning a filter bed, particularly, the corners and void areas of non-circular beds.

A normal filter consists of a container or tank which may take various forms and may be made of various materials. It may have materials of various types as collection and distribution systems therein for collection of the filtered water or solution during the filtering cycle and for the distribution of the water or solution during the backwashing or cleaning cycle. In the upper portion of the container or tank are located a series of troughs or a collection dispersal system to distribute the incoming raw or treated water or turbid solution equally to the surface of the filter bed and to collect or remove the backwash water or solution with its entrained turbidity during the backwash or cleaning cycle.

Within the container or tank disclosed herein is placed a number of layers of graded gravel, Anthrafilt, or suitable material over the bottom collection-distribution system. This acts as a further distribution for the backwash water and as a support for the actual filter media. This filter media consists of relatively fine silica sand, Anthrafilt, or other suitable material graded and sized in such a manner as to restrain and hold minute particles of raw or treated turbid matter present in the liquid to be filtered. At the same time, it must be of such a particle size and specific gravity to allow proper expansion during backwash within reasonable economical limits of backwash liquid consumption.

During the filtration cycle, the raw or treated water or solution is introduced to the filter through piping or channels and distributed to the top of the filter bed by means of the dispersal system or troughs previously mentioned. The raw or treated water or solution is maintained at a certain predetermined head over the filter which, in turn, filters down through the filter bed at a specified rate governed either by valves, orifices in the bottom collection system, or rate of flow controller mechanism. This filtration cycle is maintained until such time as the entrained particles of turbid matter removed from the raw or treated water or solution plug up the interstices between the filter media particles to a point where further operation is economically unadvisable. This is commonly termed loss of head and, at a predetermined loss of head, the cycle is manually or automatically changed to a backwash or cleaning cycle.

When the backwash cycle is put into operation, certain valves are operated to preclude the entry of raw or treated water or solution and the remaining liquid within the container or tank is drawn down until clear of the bottom collection system. Then certain valves are opened to allow access to sewer lines or collection areas from the container or tank. After this, certain valves are opened to allow the entrance of backwash water or solution to the underside of the filter container or tank and up through the dispersal system and the distributing layers of gravel, Anthrafilt, or other material and, hence, up through the layer of fine filter material. The amount of backwash liquid, which is usually pure filtered water, must be sufficient to induce expansion or separation of the fine filter media particles in the uppermost filter bed layer but must not disturb the supporting media layers. This predetermined amount of water required for proper expansion is known as rate of rise. Excessive rate of rise will result not only in disturbing or upsetting of the supporting bed but will also result in loss of fine, expensive filter media in the uppermost layer.

The dirty backwash water is collected by means of the troughs or collector system and is discharged to the sewer or collection area. This backwash cycle in which the expanded filter particles theoretically scrub against each other, thereby removing entrained turbidity, coating, or deposition, is contained until the backwash water is visually clear. The filter media is then considered clean and the cycle is reversed again to the filtration cycle.

Actually, in practise, only the relatively loose, freely removed turbidity is washed from the filter media particles by this process alone. Tightly adhering turbid matter still sticks to the individual media particles and, dependent upon the type of turbidity, will result in mud balls or in particle coating. Mud ball formation eventually leads to upset filter beds, necessitating entire rebuilding of all layers of the filter bed. Coating of particles will cause eventual cementation and complete shutdown and replacement of all filter media.

As explained above, the backwash rate or rate of rise cannot exceed a certain rate because it will not only upset the supporting bed but will cause loss of the fine filter layer material as well. Furthermore, excessive rate of rise will only result in the introduction of more water to the expanded media and a wider dispersal of media particles cushioned by the intervening water, thereby making it impossible for the particles to scrub gainst each other for removal of adhering turbid matter.

Since the backwash rates cannot be increased beyond a given point and since reduction beyond a given point has even less cleaning effect, some other device or method must be used for thoroughly cleaning each individual particle of the fine filter media. Early methods which have been tried and found either inefficient or economically unadvisable are the application of fire hose jets, air wash, mechanical and manual rakes or stirrers, and stationary grid surface wash. All of these are either too costly initially or operationally or have the common failing of not affecting all filter media particles evenly.

The first device to create even a reasonably certain method of cleaning all particles of media was a device having a rotating arm with nozzles on opposing sides of the rotating arm and driven by the reactive force of the jets. During its operation in the expanded filter media, the action of the jets caused rather thorough particle impingement and cleaning in the area immediately adjacent to the revolving arms; however, since there is a wide variety of sizes and shapes of filters, even multiple installations of these units in certain filters failed to thoroughly clean all portions of the filter equally.

Since the major portions of all large filters are square or, more often, rectangular in plan, a means of reaching corner areas and intermediate areas between units in multiple installations must either be devised or, otherwise, a method of moving the media from these areas to that immediately affected by the jets emitting from the revolving arms. Several devices have been proposed involving movable end sections of the revolving arms, movable nozzles, etc.; however, all of these deviate from simplicity of construction and operation to a point where they are not economically feasible to install, maintain, or operate.

It is, accordingly, an object of this invention to provide an agitator which is simple in construction, economical to manufacture, and simple and efficient in operation.

Another object of the invention is to provide a rotating arm for a filter bed agitator, the arm having its distal end curved in a rearward direction and jets flowing at angles from the arm.

A further object of the invention is to provide a filter bed agitator utilizing a plurality of agitator arms supported about spaced axes to agitate a large filter bed.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

FIG. 8 is a schematic view of four of the agitator arms supported in a filter tank; and FIG. 9 is a longitudinal cross sectional view of a section of an arm with an insert for a nozzle constituting another embodiment of the invention.

Figure 1:
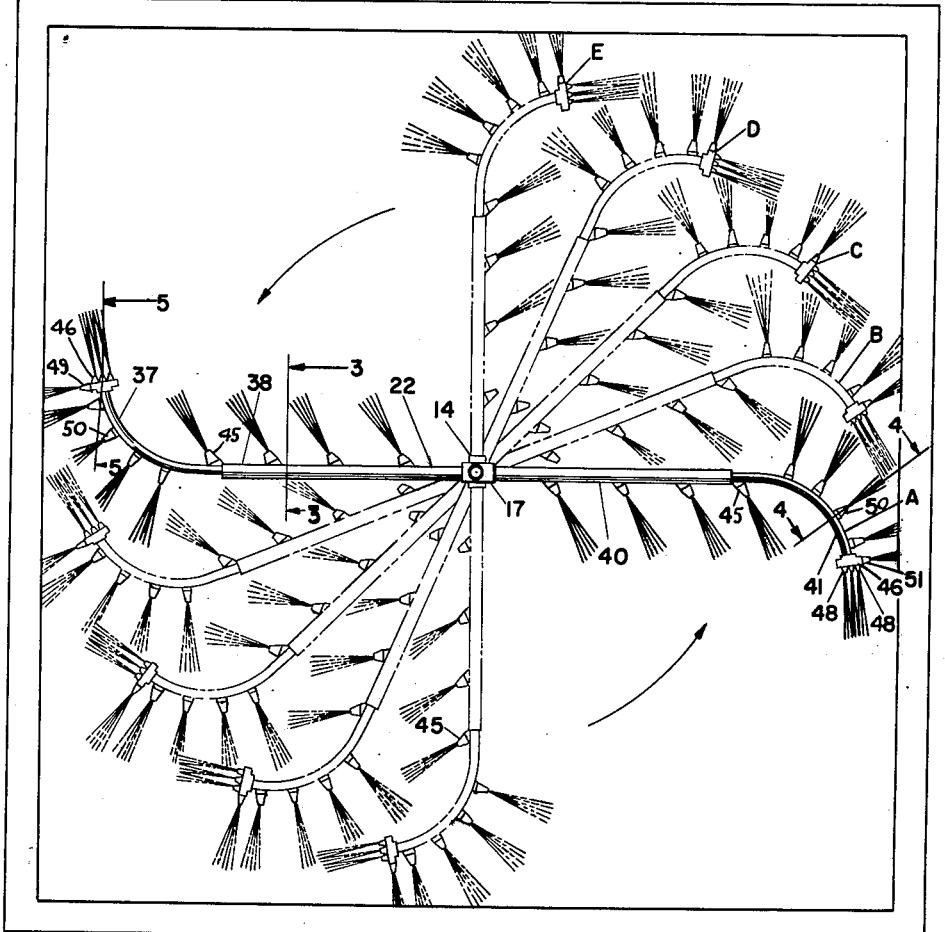
FIG. 1 is a plan view of an improved agitator showing the arm in phantom in a plurality of positions.

Now with more particular reference to the drawings, the improvement of the rotating agitator arm and bearing required to produce the changed method of filter cleaning or washing is in essence as follows:

The improved agitator is shown supported in a tank 10 having filtering material 11 therein. An S-shaped arm 22 is supported by means of a central bearing 14 suspended therefrom and tapped for and supported by the arm 22 preferably supplying water or solution at a pressure between thirty and one hundred fifty pounds per square inch from a common source of supply for operation of the rotating arm 22. The arm 22 is suspended from a freely revolving center piece 15 which in turn is attached by a threaded portion 16 to a central T 17 on the revolving agitator arm 22.

The upper portion of the bearing 14 consists of a cap 18 internally threaded at the upper end at 19 to a supporting and supply pipe 12. The lower portion of the cap 18 is threaded at 20 for introduction into and attachment to a bearing shell 21. The inner and bottom surfaces of the cap 18 act as bearing surfaces for the vertical section of a bearing center piece 23 and a center piece flange 24 which is an integral part of the center piece 23.

The bearing shell 21 is attached to the cap 18 and is internally bored for clearance for the flange 24 on the center piece 23 for a horizontal bearing surface for an assembly of a ball bearing raceway 25 and spaced raceway plates 26. Both an upper rim 27 and a lower inner bearing surface 28 are recessed to receive sealing O-rings 29 which form sealing engagement with the outside surface of the center piece 23 and the end of the shell 21, respectively. Furthermore, the shell 21 is drilled and tapped at 30 to receive a lock screw 31 which is tightened to lock the entire bearing together subsequent to assembly by engaging the threads 20. Also, the shell 21 may be drilled and tapped to receive a grease fitting 32 if and when it shall be found necessary to use such a device.

The center piece 23 is machined to a smooth peripheral surface both above and below the central flange 24 so as to provide bearing surfaces within the shell 21 to engage the surfaces thereof. The flange 24 of the center piece 23 is machined on all surfaces to provide bearing surfaces which engage the inside surface of the shell 21 and the raceway plates 26. The lower extremity of the center piece 23 is threaded at 16 for threadable attachment to the central T 17 of the revolving agitator arm 22. The ball bearing raceways 25 rotate between the raceway plates 26 to form a freely revolving movement of the center piece 23 which, in turn, supports the entire rotating arm 22 of the agitator through attachment to the central T 17.

An oil ring seal 34 consists of a graphite impregnated, oiled, or greased packing. An oiling or greasing device 32 may either be used or omitted, depending upon the type of packing used in the oil ring seal 34 or on operational conditions.

The rotating agitator arm 22 consists of two or more sizes of pipes or sections 37, 38, 40, and 41 at right angles to the vertical center line of the bearing line of the bearing 14 through the central T 17. The pipes 37, 38, 40, and 41 rotate in a counterclockwise manner at right angles to the vertical center line of the bearing 14 and parallel to the surface of the filter medium in such a path as to just clear the top surface 39 of the medium in its normal position of filtration. Normally, the center line of the rotating arm 22 will be two inches above the filter medium surface.

The sections 38 and 40 of the rotating arm 22 consist of straight pieces of pipe extending radially outwardly from the central T 17 and rotating counterclockwise parallel to the top surface of the filter medium. To each end of the sections 38 and 40 are attached the reversely curved sections of pipes 37 and 41, respectively, replacing the normally straight sections used on previously designed rotating agitators. The reversely curved sections 37 and 41 lie in the same horizontal plane as the sections 38 and 40. The overall length of the rotating arm 22 is such that the entire unit made up of the sections 37, 38, 40, and 41 rotates freely within the retaining walls of the tank 10 and without interferring with the rotation of each other if a multiple of units are required to suit size, space, and operational requirements.

Spacing of nozzles 45 on the curved arc of the sections 37 and 41 and depression of the nozzles 45 fifteen to twenty degrees downwardly from the horizontal plane is determined by the size, shape, and depth of filter bed available or required operating pressure and the number of units required per bed. Nozzles 50 are directed downwardly at the same angle from horizontal as nozzles 46.

The spacing of the nozzles 45 on the sections 38 is such that the nozzles on the rotating arm 22 will each trace a path half way between the paths of the two nozzles 46 on the section 38. Furthermore, the nozzles 45 and 46 on the sections 38 and 40 are inclined downwardly from the horizontal plane ten to fifteen degrees and outwardly ten to fifteen degrees from the common bearing center of the pipe 12. Spacing, number of nozzles, and degree of angularity downwardly from the horizontal plane and outwardly from the center are determined by the size, shape, and depth of the filter bed available or required operating pressure and number of units required per bed. The nozzle arrangement will create a change in bed equilibrium analogous to a low velocity area at the central portion of the filter bed. An attaching casting supports nozzles 48 and, also, nozzles 49 which lie generally in the same plane as the propelling nozzles 48 but not necessarily equally spaced with the nozzles 48 or on an identical plane of angularity downwardly from the horizontal plane in which the arm 22 swings.

The entire agitator consisting of the rotating arm 22 will preferably operate in a plane paralleling the horizontal surface of the filter bed and will revolve in a counterclockwise manner at a speed determined by pressures applicable to the individual application of unit or filter bed. The size of the orifices of the nozzles will be between one-sixteenth inch and three-sixteenths inch. This will also govern the speed of revolution and will, in turn, be governed by applied pressure and the size, shape, and depth of filter bed.

The nozzles 50 setting on the outer portion of the curved section 41 and, also, the nozzles 48, 49, and 50 all project jets which engage and expand the filter media mass at different angles and as they progress counterclockwise as the arm 22 rotates, the jets will continually effect a different portion of the filter media. As the jets progress toward the corner area as shown by positions A, B, and C, they will successively effect thorough forward agitation of the media in line with their angularity relative to the horizontal and to the radius of the arm 22.

As the rotation cycle progresses through positions A to E inclusive, the reverse nozzles 48 setting on a slightly different angular plane downwardly from horizontal will effect a different mass of expanded media and impart a motion to this mass at an angle partially opposing that covered by the nozzles 50 and 51. As the rotating arm 22 advances through the positions C, D, and E, the entire corner area is again agitated by the jet action of the nozzles 48 from a reverse position to that caused by the nozzles 50 and 51.

Figure 2:
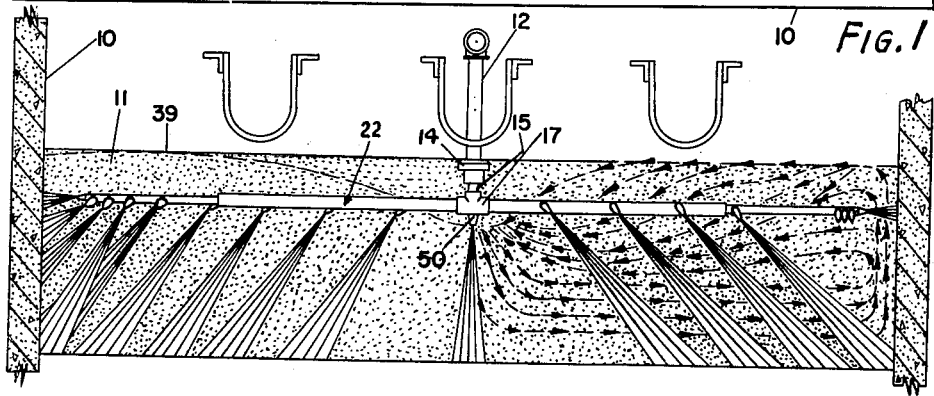
FIG. 2 is a cross sectional view of a filter tank having the improved agitator installed therein.
Figure 3:
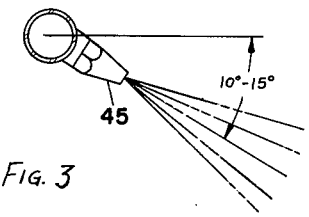
FIG. 3 is a cross sectional view taken on line 3—3 of FIG. 1.
Figure 4:
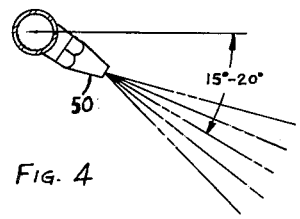
FIG. 4 is a cross sectional view taken on line 4—4 of FIG. 1.
Figure 5:
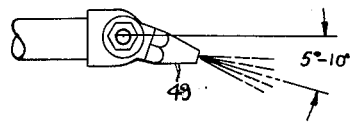
FIG. 5 is a cross sectional view taken on line 5—5 of FIG. 1.
Figure 6:
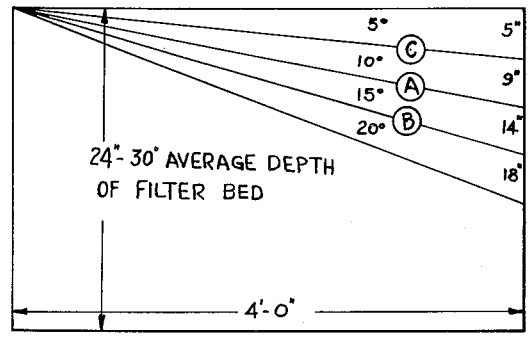
FIG. 6 is a diagram of the angular relation of the jet nozzles.
Figure 7:
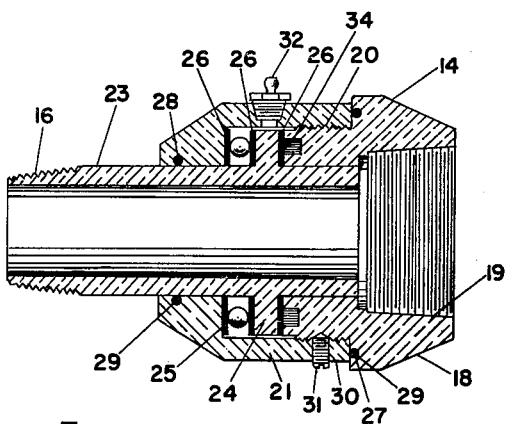
FIG. 7 is a longitudinal cross sectional view of the central bearing of the agitator.

At the same time that the nozzles 48, 50, and 51 are moving through the positions A to E inclusive, the nozzles 46 set downwardly and outwardly at different angles from the nozzles 48, 50, and 51 are also rotating and effecting an outward movement from the center to the edges of the filter to the entire media mass immediately effected by them. In the expanded media, this causes a general outward movement of the media to the edges and corners of the filter, thereby creating a lower pressure area progressively toward the center of the filter. As this mass of media reaches the filter extremities, it meets a higher pressure area caused by the restriction of the filter walls at the outward edges and corners and by the opposing action of the nozzles 46, 48, 49, 50, and 51. Since the force of gravity constantly seeks to level all points, whether suspended or otherwise, the net result of this movement is a return flow from the outward high pressure areas to the central low pressure area in the central portion of the filter. As the arm 22 progresses through the various sectors of the filter, there is a constant interchange of material from the outward filter areas, corners, and edges toward the center of the filter. This material will, in turn, be directly effected by all of the nozzles 46, 48, 49, 50, and 51 on the succeeding revolution of the rotating arm 22. In consequence, during the period of backwash cycle during which the agitator unit is operated, all of the expanded rising filter media throughout the bed is constantly moved outwardly and inwardly as indicated by the arrows in FIG. 2 so as to cause individual particle impingement throughout the entire filter bed of fine material. Also, as the rotating arm 22 progresses toward the corners of void areas, the nozzles 50 impart a forward movement to the corner or void area media. As the arm 22 progresses past the corner or void area, the nozzles 48 impart a reverse movement to the media in this same area. Therefore, on each complete revolution of the sections 38 and 40, each corner of void area receives four cleaning impulses to provide adequate cleaning which heretofore was lacking in all or part.

FIG. 8 shows another embodiment of the invention wherein four S-type revolving agitators 112, 212, 312, and 412 are disclosed installed in a larger size of filter bed tank 110. The same general arrangement of revolving agitators apply to larger installations requiring, due to size or shape of the filter, a multiple of six, eight, ten, twelve, or more agitator units.

The irregular shaped areas outside of the rotational circumference of the rotating arms, that is, corner areas 160, intermediate outer edge areas 161, and central area 162, are void areas while a circular area 163 immediately under the paths defined by the sweep of the rotating arm is an active area. Lines 164, 264, 364, and 464 indicate the paths of the ends of the agitators 112, 212, 312, and 412, respectively.

In previous designs of agitators having only straight rotating arms with one or more end jets, the active area received positive agitation during operation but the void areas received only a partial cleaning action of the inherent design features of the filter.

The S-type agitator arm disclosed herein, however, overcomes this deficiency by means of advance nozzles 150 and trailing nozzles 145, 245, 345, and 445 and 148, 248, 348, and 448 on the curved end sections of the agitator arms 112, 212, 312, and 412, respectively.

As each arm of the presently disclosed filter rotates in a counterclockwise manner driven by the propelling jets from the nozzles 145, 245, 345, and 445 and 148, 248, 348, and 448, each void area receives a forward agitating motion from nozzles 150, 250, 350, and 450 and as the outer portion of the curved section passes, a second and reverse agitating motion is imparted to the same area by the nozzles 148, 248, 348, and 448 at the trailing end of the arms. The path of the fluid from the nozzles 445 will follow a path 470. Arms 140, 240, 340, and 440 are supported on T's 117, 217, 317, and 417.

The propelling nozzles 148, 248, 348, and 448 set at an outward angle from the center line of the unit and downwardly from the horizontal center line of the arms 140, 240, 340, and 440 impart a rotary sweeping action which moves or sweeps the expanded filter media, during operation, to the outer edges or areas not immediately adjacent to the active areas.

This rotary sweeping action moves the expanded filter media from the central portion of the bed immediately under the center of the rotating arm to the outer and central void areas, thereby creating a low pressure condition in the active areas of the media.

Since the material swept from the central area concentrates in the void areas, a high pressure area develops therein. As each half of the rotating arm passes by any given area so effected, the natural force of gravity tends to level the expanded media. The denser media at the outer edges and voids necessarily settle more rapidly because the same volume of backwash effects all portions of the expanded media. Therefore, the media in the central low pressure area rises more rapidly from the upward thrust of the backwash while the denser media in the high pressure area settles.

This interchange of pressures from inner to outer void areas of the filter bed causes a complete recirculation of all expanded media. As this interchange is effected, the rotating jets from the nozzles 148, 248, 348, 448, 150, 250, 350, and 450 effect a thorough cleaning action to all portions of the bed evenly during operation.

This interchange of expanded media from inner, to outer, to inner portions of the bed combined with the double agitating action given to all void areas is an important result of the present disclosure of an improved filter bed agitator and, also, a new method of cleaning a filter bed in a manner not heretofore accomplished by previous designs.

In the embodiment of the invention shown in FIG. 9, an arm 522 could be substituted for the arms 22, 122, 222, 322, and 422 and the nozzles could be supported thereon by means of collars 545 welded in bores 560 in the arm 522 and internally threaded to receive a nozzle member.

The ability of the agitator disclosed herein to increase the outward-inward movement of the entire mass of fine filter media, thereby assuring equal and thorough cleaning of the individual particles, constitutes an improved method of backwashing filters.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A filter bed agitator adapted to be used in a rectangular filter having corners; comprising a hollow, rotatable, generally S-shaped arm, bearing means supporting said arm, said arm comprising straight sections of pipe attached to said bearing means and extending from each side of said bearing means, a curved pipe attached to the distal end of each said straight section of pipe, each said curved pipe curving in the same direction as the curved section on the opposite side of said bearing means when said arm has rotated one hundred eighty degrees, spaced nozzles on the leading edges of said curved sections at intermediate parts thereof and adjacent the inner ends thereof, said spaced nozzles each projecting fluid in a separate impulse toward one of said corners of said filter and in a direction generally toward the direction of rotation of said arm as each said curved section passes a said corner, first end jets adjacent the outer ends of said curved sections projecting fluid radially outwardly of said arm, and second end jets positioned on the outer ends of said curved sections for projecting fluid in a direction generally perpendicular to said straight sections of pipe and in a direction generally opposite to the direction of rotation of said arm and into said corners, providing a driving component for rotating said arm and generally reversing the turbulence in said corners of said filter.

2. The agitator recited in claim 1 wherein second spaced nozzles are attached to the trailing edge of each of said straight sections for agitating filter media and for providing driving force components.

3. The agitator recited in claim 2 wherein said second nozzles attached to said straight sections are directed generally outwardly to direct fluid therefrom generally outwardly.

References Cited in the file of this patent
UNITED STATES PATENTS

| | | |
|---|---|---|
| 2,199,891 | Martin | May 7, 1940 |
| 2,309,916 | Palmer | Feb. 2, 1943 |
| 2,309,917 | Palmer | Feb. 2, 1943 |